(12) United States Patent
Ebling et al.

(10) Patent No.: US 7,150,029 B1
(45) Date of Patent: Dec. 12, 2006

(54) SYSTEM FOR FORMATTING AND PROCESSING MULTIMEDIA PROGRAM DATA AND PROGRAM GUIDE INFORMATION

(75) Inventors: Mark Jacob Ebling, Indianapolis, IN (US); Edwin Arturo Heredia, San Jose, CA (US); Sithampara Niranjan, Redwood Shores, CA (US); Chia-Yuan Teng, San Diego, CA (US); Mehmet Kemal Ozkan, Istanbul (TR); Timothy William Saeger, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/529,184

(22) PCT Filed: Oct. 13, 1998
(Under 37 CFR 1.47)

(86) PCT No.: PCT/US98/21556
§ 371 (c)(1),
(2), (4) Date: Oct. 13, 2000

(87) PCT Pub. No.: WO99/20049
PCT Pub. Date: Apr. 22, 1999

Related U.S. Application Data

(60) Provisional application No. 60/061,897, filed on Oct. 14, 1997.

(51) Int. Cl.
G06F 3/00 (2006.01)
G06F 13/00 (2006.01)
H04N 5/445 (2006.01)

(52) U.S. Cl. ............................ 725/39; 725/49; 725/50; 725/54

(58) Field of Classification Search ............ 725/39–55, 725/109, 110, 132, 140, 152; 380/200
See application file for complete search history.

(56) References Cited

U.S. PATENT DOCUMENTS

| 5,515,106 | A | | 5/1996 | Chaney et al. ............... 348/461 |
|---|---|---|---|---|
| 5,600,378 | A | * | 2/1997 | Wasilewski ................. 348/468 |
| 5,768,539 | A | * | 6/1998 | Metz et al. .................. 709/249 |

(Continued)

FOREIGN PATENT DOCUMENTS

EP 805590 11/1997

(Continued)

OTHER PUBLICATIONS

Ten Kate W. et al "trigg&link": a new dimension in television program making Multimedia Applications, Services and Techniques-ECMAST'97, May 21-23, 1997, pp. 51-65.

(Continued)

Primary Examiner—Ngoc Vu
(74) Attorney, Agent, or Firm—Joseph J. Laks; Ronald H. Kurdyla; Brian J. Dorini

(57) ABSTRACT

A device for reading or writing on optical recording media with disk type recognition capability has an optical scanning device and a focus regulating circuit. The object of the invention is to provide a device of this type which can reliably recognize in a short time the type of the recording medium inserted into the device. Another object of the invention is to provide a corresponding process. These objects are attained in that the disk type recognition capability includes a mirror signal generator, a threshold value generator, a counter and an evaluation unit. The process is based on the utilization of a mirror-signal value of the device for disk type recognition.

11 Claims, 13 Drawing Sheets

U.S. PATENT DOCUMENTS

| | | | | |
|---|---|---|---|---|
| 5,818,935 A | * | 10/1998 | Maa | 380/200 |
| 6,005,562 A | * | 12/1999 | Shiga et al. | 715/721 |
| 6,005,565 A | * | 12/1999 | Legall et al. | 345/721 |
| 6,025,837 A | * | 2/2000 | Matthews et al. | 345/721 |
| 6,199,206 B1 | * | 3/2001 | Nishioka et al. | 725/51 |
| 6,268,849 B1 | * | 7/2001 | Boyer et al. | 725/40 |
| 6,469,753 B1 | * | 10/2002 | Klosterman et al. | 348/552 |

FOREIGN PATENT DOCUMENTS

| | | |
|---|---|---|
| EP | 848553 | 6/1998 |
| KR | 10-0197847 | 6/1996 |
| WO | 96/42144 | 12/1996 |
| WO | 97/43838 | 11/1997 |

OTHER PUBLICATIONS

ETS 300468 "digital broadcasting systems for television, sound and data services; specification fo service information (SI) in digital broadcasting (DVB) systems" European Telecommunication Standard, Ropean Telecommunications Standards Institute, Oct. 1995, pp. 1-61, especially pp. 38, 44 and 45.

G. Alberico and M. Cominetti "Satellite Interactive Multimedia: a new opportunity for broadcasters" International Broadcasting Convention, Sep. 12-16, 1997, pp. 18-23.

* cited by examiner

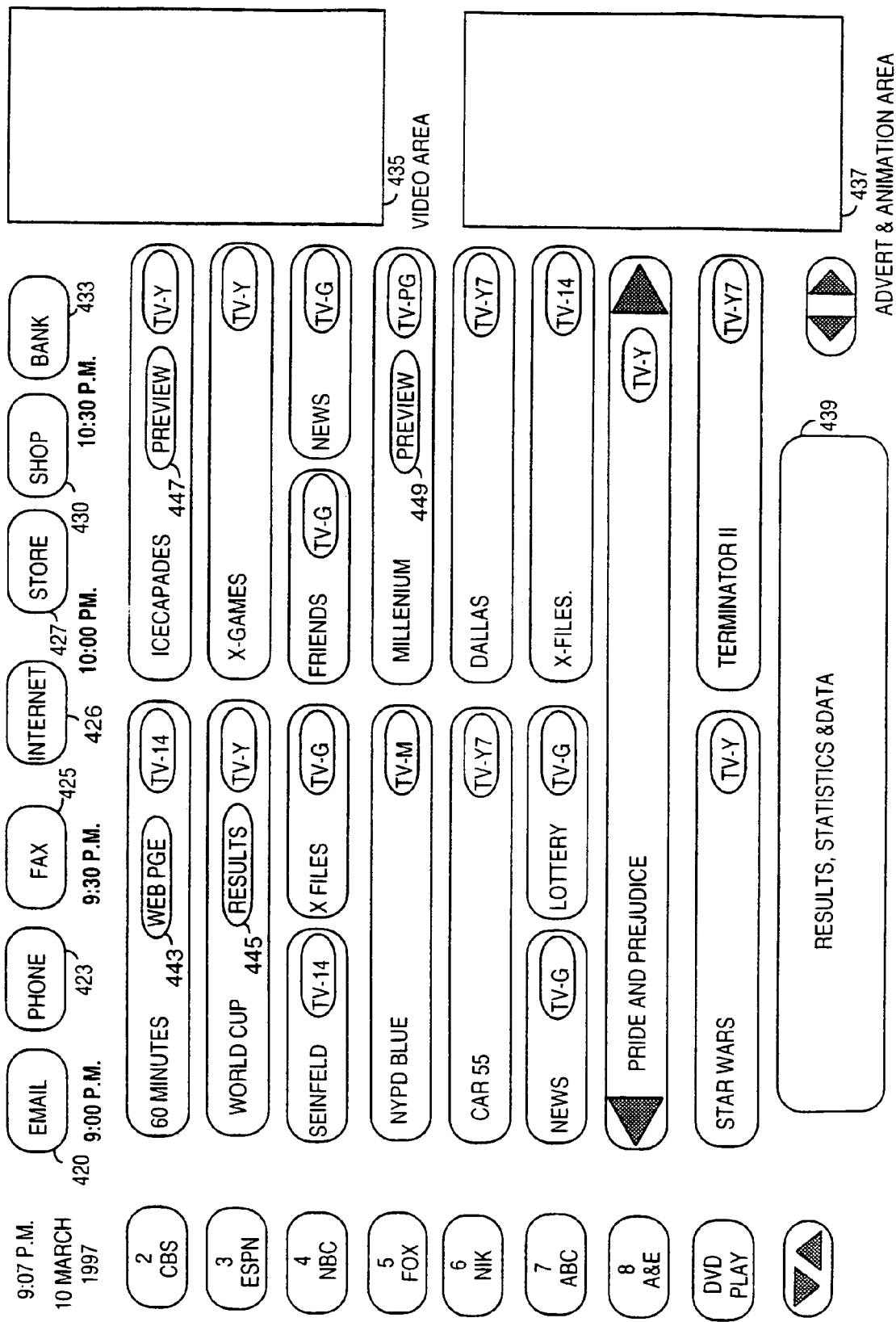

| SYNTAX | BITS | FORMAT |
|---|---|---|
| MGT_message () { | | |
|     reserved | 2 | '11' |
|     life_time | 22 | uimsbf |
|     current_time | 40 | uimsbf |
|     Num_bytes_AGDT | 16 | uimsbf |
| } | | |

300 — Num_bytes_AGDT

FIG. 3

| SYNTAX | BITS | FORMAT |
|---|---|---|
| AGDT_message () { | | |
|     reserved | 3 | '111' |
|     CCT_version | 5 | uimsbf |
|     reserved | 4 | '1111' |
|     EPG_descriptors_length | 12 | uimsbf |
|     for (i=0;i<N;i++) { | | |
|         descriptor () | var | |
|     } | | |
|     num_bytes_CCT | 16 | uimsbf |
|     number_of_networks | 8 | uimsbf |
|     for (i = 0 ; i < number_of_networks; i++){ | | |
|         reserved | 3 | '111' |
|         NIT_version | 5 | uimsbf |
|         num_bytes_NIT[i] | 16 | uimsbf |
|         reserved | 4 | '1111' |
|         network_descriptors_length | 12 | uimsbf |
|         for (i=0;i<N;i++){ | | |
|             descriptor () | | |
|         } | | |
|         program_guide_map () | var | |
|     } | | |
| } | | |

FIG. 4

| SYNTAX | BITS | FORMAT |
|---|---|---|
| program_guide_map () { | | |
|   number_channel_groupings | 4 | uimsbf |
|   SPG_map_descriptors_length | 12 | uimsbf |
|   for (i=0;I<N;i++) { | | |
| 505 —     descriptor () | var | |
|   } | | |
|   for (i = 0;I<number_channel_groupings+1;i++) { | | |
|     reserved | 4 | '1111' |
|     start_channel(i) | 12 | uimsbf |
|   } | | |
|   number_guides | 8 | uimsbf |
|   reserved | 4 | '1111' |
|   program_guide_map_size | 12 | uimsbf |
| 510 — for (i = 0; i< number_guides+1;i++) SPG_map(i) { | | |
|   next | 8 | uimsbf |
|   previous | 8 | uimsbf |
|   left_column_time | 40 | bslbf |
|   width_in_minutes | 16 | uimsbf |
|   reserved | 4 | '1111' |
|   SPG_descriptors_length | 12 | uimsbf |
|   for (i=0;i<N;i++) { | | |
| 515 —     descriptor () | var | |
|   } | | |
|   Nbytes_list_SPG (i) { | | |
| 520 —   for (j = 0;j< number_channel_groupings+1;j++) | | |
|   { | | |
|     reserved | 4 | '1111' |
|     group[j]_descriptors_length | 12 | uimsbf |
|     for (i=0;I<N;I++) { | | |
| 525 —       descriptor () | var | |
|     } | | |
|     Num_bytes_SPG[i]_CIT[j] | 16 | uimsbf |
|     Num_bytes_SPG[i]_ECIT[j] | 16 | uimsbf |
|     Num_bytes_SPG[i]_EIT[j] | 16 | uimsbf |
|     Num_bytes_SPG[i]_EEIT[j] | 16 | uimsbf |
|   } | | |
|   SPG_name_length | 8 | uimsbf |
|   for(i=0;i< SPG_name_length;i++) | | |
|     SPG_name(i) | 8 | ISO-639 |
|   } | | |
| } | | |

FIG. 5

| SYNTAX | BITS | FORMAT |
|---|---|---|
| multimedia object descriptor() { | | |
|     descriptor_tag | 8 | 0x5F |
|     descriptor_length | 8 | uimsbf |
|     object_type | 8 | uimsbf |
|     if (object_type = 0xFF) { | | |
|         extended_object_type | 16 | uimsbf |
|     } | | |
|     address_descriptor | | |
|     object_format | 8 | uimsbf |
|     object_version_number | 7 | uimsbf |
|     display_mode | 1 | 0/1 |
|     object_start_time | 40 | uimsbf |
|     object_duration_format | 2 | uimsbf |
|     object_duration | 14 | uimsbf |
|     object_frame_size | 32 | uimsbf |
| } | | |

605 — object_type
610 — address_descriptor

FIG. 6

| ELEMENT | DEFINITION |
|---|---|
| descriptor_tag | SET TO 0x5F TO IDENTIFY THE DESCRIPTOR AS AN OBJECT DESCRIPTOR. |
| descriptor_length | DESCRIPTOR LENGTH IN BYTES FOLLOWING THIS FIELD. |
| object_type and extended_object_type | SPECIFIES OBJECT TYPE. |
| address_descriptor | OBJECT ADDRESS. |
| object_format | OBJECT FORMAT. |
| object_version_number | SPECIFIES THE CURRENT VERSION OF THE OBJECT. AN APPLICATION, FOR EXAMPLE CAN USE THIS FIELD TO DETERMINE WHETHER IT SHOULD RELOAD THE OBJECT THAT IS ALREADY PRESENT IN THE BOX. |
| display mode | THIS FIELD CAN EITHER BE "ON-DEMAND"(0) OR "IMMEDIATE"(1). WHEN AN "IMMEDIATE" OBJECT BECOMES "ALIVE" AS DETERMINED BY THE Object_start_time, WE SHOULD IMMEDIATELY NOTIFY THE USER ABOUT THE AVAILABILITY. E.g.: AN OBJECT_ASSOCIATED WITH A COMMERCIAL THAT IS BEING AIRED. THE AVAILABILITY OF AN "ON DEMAND" OBJECT IS NOTIFIED TO THE USER ONLY WHEN THE USER WANTS TO SEE THE AVAILABLE OBJECTS LIST. |
| object_start_time | SPECIFIES THE TIME AT WHICH THE OBJECT BECOMES "ALIVE". THE OBJECT IS AVAILABLE FOR THE USER STARTING FROM THIS TIME. |
| object_duration_format | IF THE VALUE IS 1/2/3/4 THEN THE object_duration IS IN SECONDS, MINUTES, HOURS, OR DAYS RESPECTIVELY. |
| object_duration | SPECIFIES THE TIME AT WHICH THE OBJECT EXPIRES. |
| object_frame_size | OBJECT FRAME SIZE IN BYTES. Object_frame CONSISTS OF THE object_header AND THE ACTUAL OBJECT. |

FIG. 7

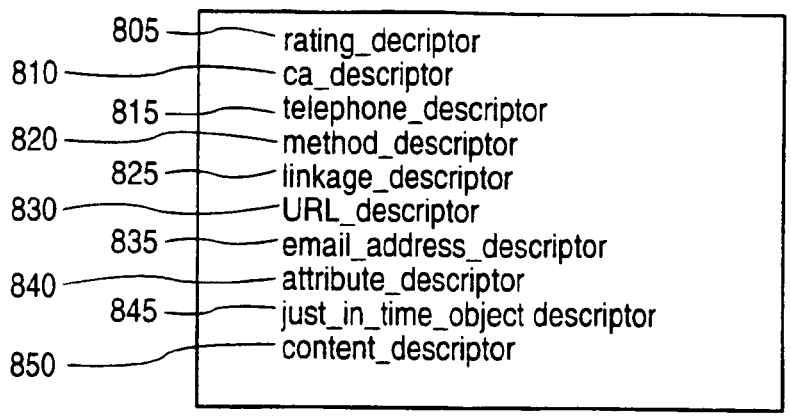

FIG. 8

| ELEMENT | DEFINITION |
|---|---|
| rating_descriptor | THE rating_descriptor SPECIFIES THE PARENTAL RATING FOR THE OBJECT. |
| ca_descriptor | THE ca_descriptor SPECIFIES THE CONDITIONAL ACCESS SYSTEM FOR THE OBJECT. |
| telephone_descriptor | THE telephone_descriptor SPECIFIES THE TELEPHONE NUMBER AND RELATED INFORMATION ASSOCIATED WITH THE OBJECT. |
| method_descriptor | THE method_descriptors ASSOCIATED WITH AN OBJECT DESCRIBE THE METHODS AND THE EVENTS THAT WILL TRIGGER THEM. |
| linkage_descriptor | THE linkage_descriptor LINKS OTHER DESCRIPTORS TO THE CURRENT OBJECT DESCRIPTOR. |
| attribute_descriptor | THE attribute_descriptor SHALL BE USED TO SPECIFY THE SPECIAL ATTRIBUTES OF THE CURRENT OBJECT. |
| just_in_time_object descriptor | THIS DESCRIPTOR IS USED TO INDICATE THE ADDRESS OF THE MODs AND OBJECTS THAT ARE NOT KNOWN IN ADVANCE. |
| content_descriptor | THIS DESCRIPTOR IS USED TO SPECIFY THE OBJECTS PROFILE VALUES FOR TARGETTED COMMERCIALS. |

FIG. 9

| SYNTAX | BITS | FORMAT |
|---|---|---|
| remote_http_object_address_descriptor() { | | |
|     descriptor_tag | 8 | uimsbf |
|     descriptor_length | 8 | uimsbf |
|     URL_length | 8 | uimsbf |
|     for (i = 0;i<URL_length;i++) { | | |
|         URL(i) | 8 | ISO-639 |
|     } | | |
| } | | |

905 points to URL(i)

FIG. 10

| SYNTAX | BITS | FORMAT |
|---|---|---|
| DSM-CC_object_address_descriptor() { | | |
|     descriptor_tag | 8 | uimsbf |
|     descriptor_length | 8 | uimsbf |
|     DSM-CC_association_tag | 16 | uimsbf |
| } | | |

910 points to DSM-CC_association_tag

FIG. 11

| SYNTAX | BITS | FORMAT |
|---|---|---|
| MPEG_PSI_PS_address_descriptor() { | | |
|     descriptor_tag | 8 | uimsbf |
|     descriptor_length | 8 | uimsbf |
|     default_primary_location_bit | 1 | 0/1 |
|     if (default_primary_location_bit == 0 ) { | | |
|         network_id | 8 | uimsbf |
|         transport_channel_id | 8 | uimsbf |
|     } | | |
|     default_secondary_location_bit | 1 | 0/1 |
|     if (default_secondary_location_bit == 0) { | | |
|         PID | 13 | uimsbf |
|         table_id | 8 | uimsbf |
|         table_id_extension | 16 | uimsbf |
|     } | | |
| } | | |

915 → network_id
920 → transport_channel_id
925 → PID
930 → table_id

FIG. 12

| SYNTAX | BITS | FORMAT |
|---|---|---|
| descriptor_tag | 8 | uimsbf |
| descriptor_length | 8 | uimsbf |
| 950 — number_elements | 8 | uimsbf |
| for (i=0;i<number_elements;i++) { | | |
|     reserved | 3 | '111' |
|     size_flag | 1 | uimsbf |
| 955 —   element_identifier | 12 | uimsbf |
|     if (transport == broadcast) { | | |
| 960 —       transport_channel_ID | 8 | uimsbf |
|       reserved | 3 | '111' |
| 965 —       PID | 13 | uimsbf |
|     } | | |
|     else if (transport == file based) { | | |
|       file_name_length | 8 | uimsbf |
|       for (i=0;i<address_length;i++) | | |
| 970 —         file_char | 8 | ISO-639 |
|     } | | |
|     if (size_flag == 1) { | | |
|       element_size | 32 | uimsbf |
| } | | |

FIG. 13

| element_identifier | description |
|---|---|
| 0x000 | user private |
| 0x001 | Private Information Parcel (PIP) |
| 0x002 | Extended Text Table (ETT) |
| 0x003 | Network Information Table (NIT) |
| 0x004 | Special Program Guide (SPG) |
| 0x005 | Channel Information Table (CIT) |
| 0x006 | Extented Channel Information Table (ECIT) |
| 0x007 | Event Information Table (EIT) |
| 0x008 | Extended Event Information Table (EEIT) |

FIG. 14

| SYNTAX | BITS | FORMAT |
|---|---|---|
| location_descriptor () { | | |
| 980 — descriptor_tag | 8 | uimsbf |
|     descriptor_length | 8 | uimsbf |
|     number_PIDs | 8 | uimsbf |
|     reserved | 7 | '1111111' |
|     implicit_flag | 1 | bslbf |
| 985 — if (implicit_flag == 0x00){ | | |
| 987 —   for (i=1;i<number_PIDs;I++){ | | |
|       reserved | 3 | '111' |
| 990 —     PID[i] | 13 | uimsbf |
|       SType[i] | 8 | uimsbf |
|     } | | |
| } else { | | |
|     reserved | 3 | '111' |
| 993 — base_PID | 13 | uimsbf |
| } | | |
| } | | |

FIG. 15

| SYNTAX | BITS | FORMAT |
|---|---|---|
| location_descriptor () { | | |
|    descriptor_tag | 8 | uimsbf |
|    descriptor_length | 8 | uimsbf |
|    number_SCIDs | 8 | uimsbf |
|    reserved | 6 | '111111' |
|    Z_bit | 1 | bslbf |
|    implicit_flag | 1 | bslbf |
|    if (implicit_flag == 0x00){ | | |
|       for (i=1;i<number_SCIDs;i++){ | | |
|          if (Z_bit==0) | | |
|             SCID[i] | 8 | uimsbf |
|          else{ | | |
|             reserved | 4 | '1111' |
|             SCID[i] | 12 | uimsbf |
|          } | | |
|          SType[i] | 8 | uimsbf |
|       } | | |
|    } else { | | |
|       if (Z_bit==0) | | |
|          base_SCID | 8 | uimsbf |
|       else{ | | |
|          reserved | 4 | '1111' |
|          base_SCID | 12 | uimsbf |
|       } | | |
|    } | | |
| } | | |

FIG. 16

SYSTEM FOR FORMATTING AND PROCESSING MULTIMEDIA PROGRAM DATA AND PROGRAM GUIDE INFORMATION

This application claims the benefit of Provisional application Ser. No. 60/061,897, Oct. 14, 1997.

FIELD OF THE INVENTION

This invention is related to the field of digital signal processing, and more particularly to the acquisition, formation and processing of Multimedia program guide and program content Information.

BACKGROUND OF THE INVENTION

Home entertainment systems which combine Personal Computer and television functions (PC/TV systems), are increasingly becoming, generic, User interactive, multiple source and multiple destination communication devices. Such multimedia systems are required to communicate in different data formats between multiple locations for a variety of applications in response to User requests. For example, a PC/TV system may receive data from satellite or terrestrial sources comprising High Definition Television (HDTV) broadcasts, Multi-point Microwave Distribution System (MMDS) broadcasts and Digital Video Broadcasts (DVB). A PC/TV system may also receive and transmit data via telephone (e.g. the Internet) and coaxial lines (e.g. cable TV) and from both remote and local sources such as Digital Video Disk (DVD), CDROM, VHS and Digital VHS (DVHS™) type players, PCs, and many other types of sources.

Forming and processing program guide data containing program content from numerous sources for multimedia applications presents a number of problems for such a generic PC/TV entertainment system. For example, such a system may be required to process multimedia content including audio clips, video clips, animation, still images, text and other types of data encoded in different data formats. Specifically, difficulties arise in structuring program content and program guide data to facilitate the acquisition and decoding of multimedia content of different data format and from different sources. These problems and derivative problems are addressed by a system according to the present invention.

SUMMARY OF THE INVENTION

A program specific information data structure facilitates communication of program content and program guide information with attached multimedia data including audio, video, animation, still image, Internet, Email, text and other types of data. The data structure supports uni-directional communication applications e.g. passive viewing and bi-directional communication applications e.g. interactive type functions. A decoder processes packetized program data containing ancillary description information including multimedia object type, location and other descriptive indicators. These indicators are used in acquiring, and decoding multimedia objects derived from different sources for presentation in composite video images representing video program content or program guides, for example. Additional ancillary location and acquisition description information enables acquisition of supplementary program specific information elements and program content data.

In the drawing:

FIG. 2 shows an exemplary program guide display containing multimedia objects, according to the invention.

FIGS. 3–6 show, respectively, a Master Guide Table (MGT), Additional Guide Data Table (AGDT), Channel Information Table (CIT) and a Multimedia Object Descriptor (MOD) Table used in the hierarchical data structure of FIG. 1, according to the invention.

FIG. 7 describes the elements of the Multimedia Object Descriptor (MOD) Table of FIG. 6, according to the invention.

FIGS. 8 and 9 respectively list and describe other descriptors that may be incorporated in program specific information to facilitate multimedia data acquisition and decoding, according to the invention.

FIGS. 10, 11 and 12 list acquisition descriptors for use in acquiring multimedia objects from exemplary locations including Internet locations, digital storage media datastream locations and MPEG PSI stream locations respectively, according to the invention.

FIG. 13 shows an acquisition descriptor for acquiring program specific information and multimedia objects from different sources including MPEG PSI streams and Internet locations, for example, according to the invention.

FIG. 14 shows an exemplary list of the types of tables that may use the acquisition descriptor of FIG. 13, according to the invention.

FIGS. 15 and 16 respectively show location descriptors for use in identifying multimedia content data from different sources including an MPEG compatible source and a Digital Satellite System (DSS) source, according to the invention.

Figure 17:
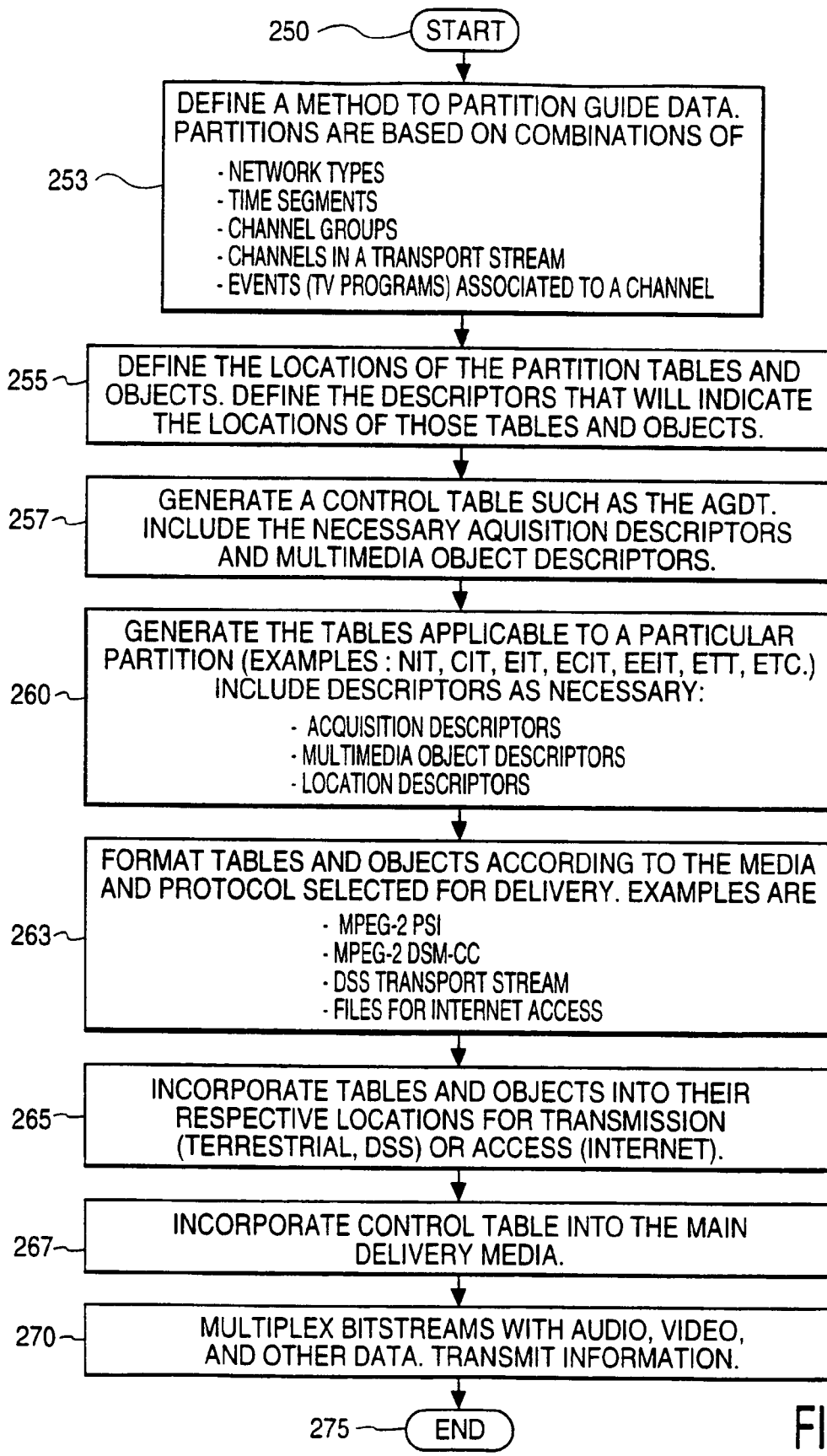

FIG. 17 shows a flowchart of a method for forming program specific information to convey multimedia objects, according to the invention.

Figure 18:
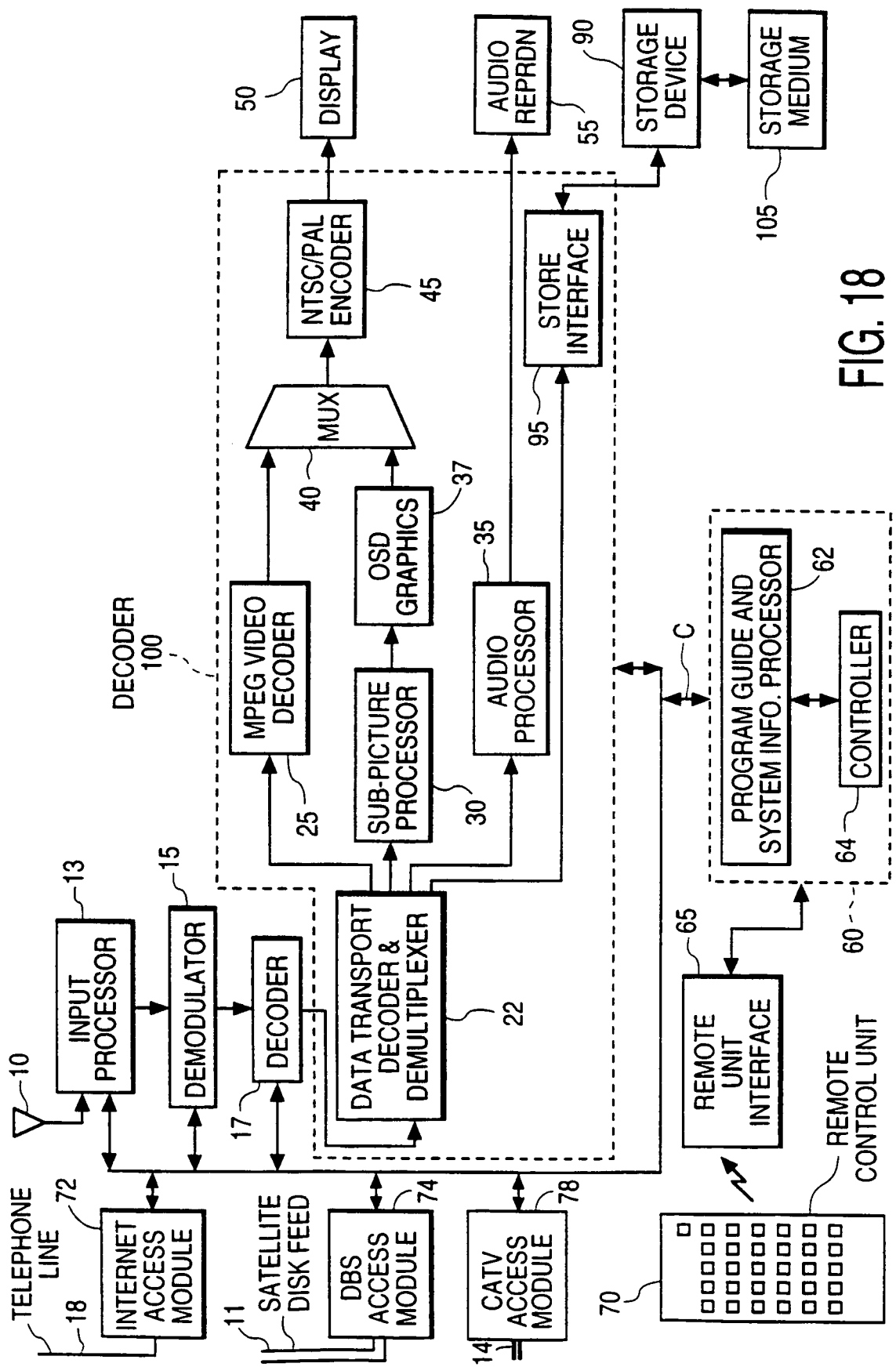

FIG. 18 shows a home entertainment decoder system for forming and decoding multimedia program data and program guide information, according to the invention.

DETAILED DESCRIPTION OF THE DRAWINGS

Program specific information (PSI) includes program guide data and information for use in identifying and assembling individual data packets to recover the content of selected program channels. Program specific information and associated program content is advantageously structured to support communication of multimedia objects including audio clips, video clips, animation, still images, Internet data, Email messages, text and other types of data. Multimedia objects are data entities that may be viewed as independent units and are associated with images within individual programs or with program guide components. The multimedia objects are incorporated into composite video images representing a program guide or a video program, for example. The data structure supports uni-directional communication applications e.g. passive viewing and bi-directional communication applications e.g. interactive type functions and also supports storage applications.

The program specific information and associated program content may be delivered by different service providers via the Internet, or via terrestrial, satellite or cable broadcast on a subscription or other pay per view basis. The data structure facilitates acquisition and decoding of multimedia objects encoded in different data formats and which are communicated in different communication protocols from both local and remote sources. An exemplary decoder, receives program content from satellite, cable and terrestrial sources including via telephone line from Internet sources, for example.

Hereinafter, data referred to as being MPEG compatible conforms to the MPEG2 (Moving Pictures Expert Group) image encoding standard, termed the "MPEG standard". This standard is comprised of a system encoding section (ISO/IEC 13818-1, 10th Jun. 1994) and a video encoding section (ISO/IEC 13818-2, 20th Jan. 1995).

Data structure elements according to the invention principles may be conveyed in MPEG compatible format (per section 2.4.4 of the MPEG systems standard) or may be conveyed in a format compatible with the *Program and System Information Protocol for Terrestrial Broadcast and Cable*, published by the Advanced Television Systems Committee (ATSC), 10 Nov. 1997, hereinafter referred to as the PSIP standard or other ATSC standards. Further, the data structure elements may be formed in accordance with proprietary or custom requirements of a particular system.

The principles of the invention may be applied to terrestrial, cable, satellite, Internet or computer network broadcast systems in which the coding type or modulation format may be varied. Such systems may include, for example, non-MPEG compatible systems, involving other types of encoded datastreams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

Figure 1:
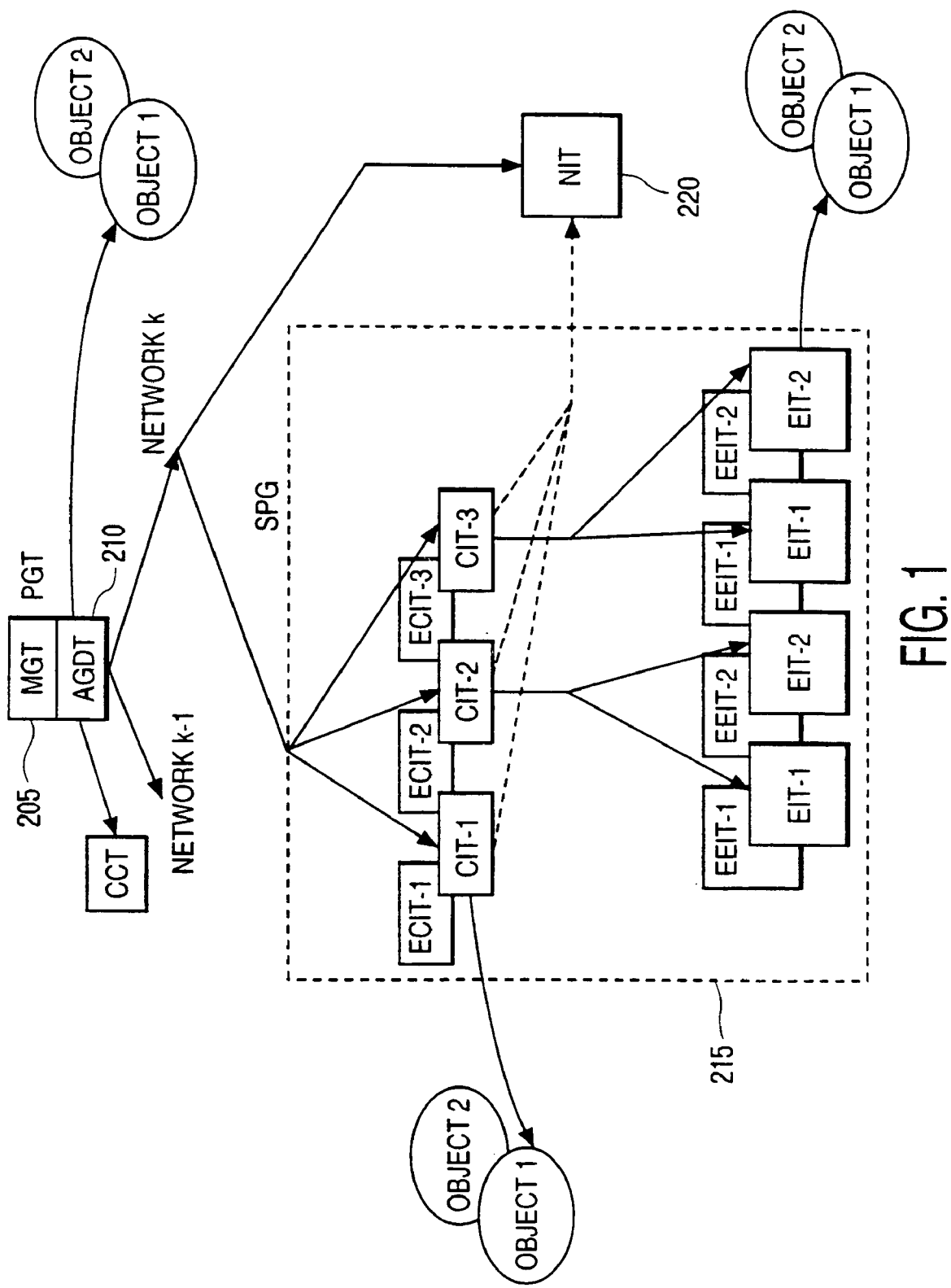
FIG. 1 shows an exemplary hierarchical program guide data structure for conveying multimedia object data, according to the invention.

FIG. 1 shows an overview of an exemplary hierarchical program specific information data structure for conveying multimedia object data, according to the invention, The structure comprises multiple hierarchically arranged and interlinked tables and multimedia objects (Object 1 and Object 2). The tables consist of arrays of data and parameters which are used to enumerate and describe collections or sequences of TV channels, TV programs, channel parameters, program parameters, associated multimedia objects and object parameters, etc- The exemplary hierarchical table arrangement of FIG. 1 includes a Master Guide Table (MGT) 205, Additional Guide Data Table (ADGT) 216, and a Special Program Guide (SPG) 215 including Channel Information Tables (CIT-1, CIT-2, CIT-3), Event Information Tables (EIT-1, EIT-2), Network Information Table NIT 220, and optional tables such as Extended Channel Information Tables (ECIT-1, ECIT-2, ECIT-3), and Extended Event Information Tables (EEIT-1, EEIT-2).

The MGT contains information for use in acquiring program specific information conveyed in other tables and specifically, in this exemplary embodiment, provides information for use in acquiring the AGDT. The AGDT contains information for determining the structure and table partitioning of the program specific information. The CIT contains information for tuning and navigation to receive a User selected program channel. The EIT contains descriptive lists of programs (events) receivable on the channels listed in the CIT. Either a CIT, EIT or other table may be used to convey information enabling a user to select and tune to a particular program. A CIT is typically used to convey parameters for acquiring audiovisual program content data that remains constant over several events (TV programs). An EIT is typically used to convey parameters of audiovisual program content data that remain constant for an event (individual TV program). The NIT contains parameter lists for the entire broadcast network (terrestrial, satellite, cable, etc.). The ECIT and EEIT are extension tables accommodating additional CIT and EIT information. Additional program specific information describing and supplementing items within the hierarchical tables is conveyed within descriptor information elements.

This data structure advantageously enables multimedia objects and table information located at a plurality of different remote and local sources to be acquired at a decoder and assembled to produce an individual program and program guide for display to a user. The data structure incorporates address and protocol information for identifying and acquiring tables and objects from a variety of sources. The data structure enables objects to be positioned anywhere in a program guide and to be associated with individual program specific information table elements. A decoder uses the address and protocol information and other parameters in the data structure to acquire and format a composite program guide and programs from tables and objects derived from a plurality of distributed sources. As such the data structure offers flexibility and adaptability advantages and provides a comprehensive mechanism for conveying a multiplicity of distributed multimedia objects in a manner that facilitates efficient decoding and reproduction of composite video images and audio segments. Other methods of partitioning program specific information may be used in conveying multimedia objects and may achieve similar flexibility, adaptability and efficiency advantages by employing the table structuring, and multimedia object definition and acquisition information, according to the invention principles. The elements of the data structure presented in FIGS. 1–16 are considered to be optional and may be used or omitted based on the requirements of a particular system.

FIG. 2 shows an exemplary program guide display that may be produced by a decoder from the program specific information structure, according to the invention. The program guide contains multimedia objects and provides a user interface that supports Email, telephone, fax. Internet browsing, storage, home shopping, home banking (420, 423, 425, 426, 427, 430, and 433, respectively) and other functions. Multimedia objects such as video clips, Internet web page data or still images may be displayed in area 435 in response to user selection of a preview icon (e.g., 447) or a web page icon (e.g., 443). Data and text such as Email messages, sports results or stock quotes etc. are displayed in area 439 in response to user selection results (e.g., 445) or in response to user selection of functions 420, 423, 425, 426, 427, 430, and 433. Advertisements and animation may similarly be displayed in area 437.

FIGS. 3–6 show, respectively, a Master Guide Table (MGT), Additional Guide Data Table (AGDT), Channel Information Table (CIT) and a Multimedia Object Descriptor (MOD) table used in the hierarchical data structure of FIG. 1, according to the invention. FIG. 3 shows an MGT providing pointed information specifically for use in acquiring the AGDT, such as, for example, the size (300) of the AGDT in bytes.

FIGS. 4 and 5 comprise an exemplary AGDT for conveying information for acquiring and assembling the other tables and components of the program specific information. The AGDT describes the structure and locations of the data partitions that are used in conveying the program specific information. A decoder uses the control information in the AGDT in assembling the program specific information and in creating a program guide for display. Although the AGDT is shown as separate Figures for clarity (FIGS. 4 and 5), the AGDT actually comprises a single table in which the syntax of FIG. 5 occupies the program_guide_map element 415 of FIG. 4.

The AGDT syntax of FIG. 4 indicates a first level of program specific information partitioning and provides:

An overall description for the entire guide (e.g. descriptor 405).

A definition of partitioning of network parameters (for cable, terrestrial, digital broadcast satellite, Internet, type networks, for example).

One or more pointer descriptors may be inserted at line 405 of FIG. 4 to indicate the location of the entire program specific information and/or its table components. Similarly, if network-based partitioning is used, the location of network information tables can be indicated by inserting proper pointer descriptors in line 410. Table pointer descriptors comprise acquisition descriptors as exemplified by the syntax structure of FIG. 13 which is discussed later. Further, multimedia object descriptors (MODs) may be inserted in the AGDT at line 405, to associate multimedia objects external to the program specific information with the program specific information (or program guide) as a whole, or may be inserted at line 410, to associate external objects with particular network parameter arrangements. An external multimedia object is an object that is provided by a remote or local source and is not conveyed within the program specific information itself. For example, an advertisement sponsoring a program guide conveyed within the program specific information may be linked to the guide for display by using one or more MODs in line 405.

In order to support such a function, an MOD advantageously incorporates indications of:

the type of object being described (e.g. Email MIME format, Internet HTML, still image JPEG format, video clip MPEG2 format etc.)

the location of the object (PSI bit stream, FTP site, WWW site, DSM-CC stream, etc.)

An exemplary MOD syntax structure incorporating an object type indicators and address location pointer is presented in FIG. 6 and is discussed in more detail later.

The AGDT syntax of FIG. 5 indicates a second level of program specific information partitioning that may be used to partition program specific information by time segment and channel characteristic or group. The program specific information time segment partitions are defined by a syntax element loop beginning at line 510. Pointer (location) descriptors for locating tables or objects may be inserted at line 515. Further, one or more additional pointer descriptors may be inserted at line 505 of FIG. 5 to indicate the location of multimedia objects and tables that are valid for all the time segment partitions. The program specific information channel characteristic partitions are defined by a syntax element loop beginning at line 520 and pointer (location) descriptors for locating tables or objects for particular channel groups may be inserted at line 525. Further, multimedia object descriptors (MODs) may also be inserted in the AGDT descriptor sections of FIG. 5 to associate multimedia objects external to the program specific information with particular time segments or channel groups. As previously stated, AGDT elements may be viewed as optional in tailoring the data structure for particular system requirements. For example, the previously described syntax enabling partitioning of the program specific information into different channel groups may be omitted in a particular application.

FIG. 6 shows an exemplary multimedia object descriptor (MOD) for use in defining multimedia objects to be incorporated in displayed program content or in a displayed program guide, for example. The MOD syntax shown in FIG. 6 may be incorporated in a plurality of locations throughout the program specific information structure in order to associate multimedia objects with individual image or data components of a program guide or program content. The MOD identifies objects associated with program specific information components using the object type field (line 605) and identifies the location of the object to enable its acquisition using the address descriptor field (line 610). The key elements of the MOD shown in FIG. 6 may be advantageously used for conveying multimedia object acquisition information in a wide variety of data transport structures that may be used to deliver program content or program guide information. Such transport structures, for example, may include MPEG-PSI, Internet TCP/IP (Transport Control Protocol/Internet Protocol), DSS (Digital Satellite System), ATM (Asynchronous Transfer Mode) etc.

FIG. 7 describes the elements of the Multimedia Object Descriptor (MOD) of FIG. 6.

FIG. 8 (Items 805, 810, 815, 820, 825, 830, 835, 840, 845 and 850) and FIG. 9 respectively list and describe other descriptor types that may be incorporated in program guide information to facilitate multimedia object acquisition and decoding, according to the invention.

FIGS. 10, 11 and 12 list address descriptors for use in acquiring multimedia objects from exemplary locations including Internet locations, digital storage media datastream locations and MPEG PSI stream locations respectively. Any or all of these address descriptors (or alternatively defined address descriptors) may be included within the MOD at line 610 of FIG. 6. The descriptor of FIG. 10 identifies web-based locations from which multimedia objects are acquired using an Internet URL address 905. The descriptor of FIG. 11 identifies objects in a DSM-CC (Digital Storage Medium-Command and Control) stream from which multimedia objects are acquired using a DSM-CC_association_tag 910 as a link with a particular object in a DSM-CC carousel. The descriptor of FIG. 12 identifies locations of objects in an MPEG-2 PSI stream. Within the descriptor of FIG. 12, item 915 identifies a particular network (e.g. satellite, cable, or terrestrial), item 920 identifies a particular network transport stream (transport stream id), item 925 identifies packets within a particular stream using a Packet Identifier (PID) and item 930 identifies particular table associations of the packets with table identifiers (table_id and table_id_extension). Similar descriptors may be derived for other media according to the invention principles exemplified in FIGS. 10–12.

FIG. 13 shows an acquisition descriptor for defining table locations for acquiring program specific information and multimedia objects from different sources including MPEG PSI streams and Internet locations, for example. This descriptor may be used throughout the program specific information structure to identify table locations. The acquisition descriptor of FIG. 13 may be used at line 405 of the AGDT of FIG. 4 to identify tables that are not associated with particular program specific information parameters. Alternatively, the acquisition descriptor of FIG. 13, may be used at line 410 of the AGDT of FIG. 4 to identify tables associated with particular networks. Further, the acquisition descriptor of FIG. 13, may be used in other portions of the AGDT, such as within time-based partitions of particular channel groups. As an example, the descriptor of FIG. 13 incorporates elements for acquiring program specific information tables from two separate sources. Specifically, (1) items 960 and 965 enable data acquisition from MPEG-2 PSI streams, and (2) item 970 enables data acquisition from an Internet address such as from an FTP or HTTP compatible source.

The FIG. 13 descriptor structure is flexible and readily accommodates additional different addressing methods through the addition of extra "else if" statements to the descriptor. In adapting or expanding the FIG. 13 data structure to encompass additional addressing elements, item 955 is used to identify the particular table being defined in the FIG. 13 execution loop and item 950 determines the number of tables for which acquisition locations are defined.

FIG. 14 shows an exemplary list of the types of tables that may use the acquisition descriptor of FIG. 13 and that may be incorporated into the program specific information structure, according to invention principles. In using the acquisition descriptor of FIG. 13 to acquire the tables listed in FIG. 14, the element identifier values of the desired table listed within FIG. 14 are inserted in the element identifier field at line 955 of the acquisition descriptor of FIG. 13. Other tables may also be acquired, partitioned and incorporated in the program specific information structure as desired using data structuring principles described.

FIGS. 15 and 16 show examples of a location descriptor for use in acquiring multimedia audiovisual content data from different sources using different communication protocols and data formats (as distinct from the descriptor of FIG. 14 used in acquiring program specific information from different sources). The location descriptor exemplified in FIGS. 15 and 16 may be incorporated into program specific information tables such as into a Channel Information Table (CIT) or into an Event Information Table (EIT) and is used to identify audiovisual content data within input datastreams. Specifically, FIG. 15 shows an example of a location descriptor for use in acquiring audiovisual data from an MPEG compatible source and FIG. 16 shows an example of the location descriptor data structure for use in acquiring audiovisual data from a Digital Satellite System (DSS) source. A plurality of location descriptors may be included in program specific information in order to acquire audiovisual content data from, (a) multiple different sources and types of media (e.g. MPEG, Internet, cable sources), and (b) from different addresses associated with a particular source or media type (e.g. from different Internet addresses or cable TV channels).

In the location descriptor example of FIG. 15 MPEG compatible audiovisual data is identified by PID value. The location descriptor of FIG. 15 includes two methods of data acquisition based on PID value. The two methods are referred to as an implicit method and an explicit method respectively. Selection between the two methods is determined by an input implicit flag indicator 985.

In the explicit method, the PIDs, e.g. PID 990, are individually listed within a loop beginning at line 987. In the implicit method a base PID 993 is defined and other PIDs are derived from the base PID in accordance with a predetermined PID definition e.g. as a function of program channel number and stream type. Such an implicit method is known and described for example in an ATSC standard. The stream type associated with a particular PID is defined by element SType[i] in FIGS. 15 and 16.

In the location descriptor example of FIG. 16 audiovisual data from a Digital Satellite System (DSS) source is identified by SCID (Service Component Identifier) value. The location descriptor of FIG. 16 includes two methods of data acquisition (an implicit and explicit method) based on SCID value, in similar fashion to the MPEG example of FIG. 15. Selection between the two methods is determined by an input implicit flag indicator 353.

In the explicit method, the SCIDs, e.g. SCID 355 or 357, are individually listed within a "for" loop beginning following line 353. In the implicit method a base SCID 360 or 363 is defined and other SCIDs are derived from the base SCID in accordance with a predetermined SCID definition, as previously mentioned. In the DSS case, however, the SCID values may have two different sizes. Consequently, within the DSS location descriptor structure an input selection parameter (Z_bit) is used in selecting between SCID values. Specifically, in FIG. 16 selection parameter (Z_bit) is used in selecting between SCIDs 355 and 357 in the explicit case and in selecting between SCIDs 360 and 363 in the implicit case.

The descriptor tag 980 of FIG. 15 and the descriptor tag 350 of FIG. 16 are used within a decoder for identifying a descriptor type and for automatically differentiating between descriptors. In a decoder, it is determined whether a particular desired channel (and associated program) is transmitted from a particular source (e.g. satellite, terrestrial, cable, or Internet source) and thereupon the corresponding satellite, terrestrial, cable, or Internet location descriptor is selected for use. A variety of other location descriptors may be defined in similar fashion to those exemplified in FIGS. 15 and 16. Such other descriptors may be used to acquire digital audiovisual services from sources including, for example, streamed audio and video over the Internet, ATM networks, etc.

FIG. 17 shows a flowchart of a method for forming program specific information to convey multimedia objects, according to the invention. The method of FIG. 17 generates program specific information including MGT, AGDT, CIT, ECIT, EIT, EEIT, NIT and ETT data and descriptors containing the advantageous features previously described. The method may be employed at an encoder for broadcasting video data or the method may be employed within a decoder unit.

Following the start at step 250 of FIG. 17, in step 253, a method based on the previously described data structuring principles is selected for partitioning program specific information. The program specific information is partitioned in accordance with network types, time segments, channel groups, transport stream channel groupings and the programs (events) being transmitted on particular channels. In step 255, the locations of table partitions and the tables and sub-tables (extended tables) required to accommodate the partitioned program specific information are identified and descriptors for identifying and acquiring the tables and associated multimedia objects are formed. In step 257 an AGDT (or another type of control table) is generated to include those formed acquisition and multimedia object descriptors generated in step 257 that apply to the AGDT level of program specific information structure. In addition, an MGT is generated in step 257 containing information for use in acquiring program specific information conveyed in other tables and specifically for use in acquiring an AGDT.

In step 260 individual CIT, ECIT, EIT, EEIT, NIT and ETT etc. tables are formed complying with the partitioned structure. The individual tables incorporate acquisition descriptors, multimedia object descriptors (MODs) and location descriptors derived according to the previously described invention principles. A CIT is formed containing sub-channel and program identification information enabling acquisition of available broadcast programs and channels. containing packet identifiers for identifying individual packetized datastreams that constitute individual programs to be transmitted on particular channels. The generated CIT also incorporates items linked to listed program channels including a program number, a PCR (Program Clock Reference) identifier, a language code indicator, and a stream type identifier, for example.

Further, in step 260, an EIT is generated containing program guide information including descriptive lists of programs (events) receivable on the channels listed in the CIT. Also in step 260, an NIT is created and an ETT is generated containing text messages describing programs, for example. Further, extension tables are formed as necessary to accommodate additional partitioned program specific information.

In step 263, the tables formed in step 260, together with associated multimedia objects, are formatted to be compatible with a desired data format and protocol. Such data formats and protocols include, for example, MPEG2 compatible Program Specific Information, MPEG2 DSM-CC, DSS, and an Internet compatible file transfer format. In step 265, the resulting formatted tables and multimedia objects are incorporated into a datastream in their designated locations for terrestrial transmission. The AGDT is incorporated into the datastream in step 267.

In step 270, the program specific information produced in step 267, together with video and audio program representative components (and other data) for multiple channels, is multiplexed and formatted into a transport stream for output. In step 270, the output transport stream is further processed to be suitable for terrestrial transmission to another device such as a receiver, video server, or storage device for recording on a storage medium, for example. The processes performed in step 270 include known encoding functions such as data compression Reed-Solomon encoding, interleaving, scrambling, trellis encoding, and carrier modulation. The process is complete and terminates at step 275. In the process of FIG. 17, multiple CIT, EIT, ETT and associated extension tables may be formed and incorporated in the program specific information in order to accommodate expanded numbers of channels. Further, in other embodiments the tables may be similarly processed for satellite, cable or Internet transmission, for example.

FIG. 18 is a block diagram of a digital video receiving system for demodulating and decoding broadcast (terrestrial, satellite, cable, or Internet) signals. In terrestrial mode, a carrier modulated with signals carrying program representative MPEG compatible audio, video and associated data received by antenna 10, is converted to digital form and processed by input processor 13. Processor 13 includes radio frequency (RF) tuner and intermediate frequency (IF) mixer and amplification stages for down-converting the input signal to a lower frequency band suitable for further processing. In this exemplary system, the terrestrial input signal received by antenna 10 contains 33 Physical Transmission Channels (PTCs 0–32). Each Physical. Transmission Channel (PTC) is allocated a 6 MHz bandwidth and contains, for example, up to 6 sub-channels.

It is assumed for exemplary purposes that a video receiver user selects a sub-channel (SC) for viewing using remote control unit 70. Processor 60, which includes a program guide and system information processor 62 and control 64, uses the selection information provided from the remote control unit 70 via interface 65 to appropriately configure the elements of decoder 100 to receive the PTC corresponding to the selected subchannel SC, Following down conversion, the output signal from unit 13 for the selected PTC has a bandwidth of 6 MHz and a center frequency in the range of 119–405 MHz. In the following discussion, an RF channel or Physical Transmission Channel (PTC) refers to an allocated broadcaster transmission channel band which encompasses one or more sub channels (also termed virtual or logic channels).

Processor 60 configures the radio frequency (RF) tuner and intermediate frequency (IF) mixer and amplification stages of unit 13 to receive the selected PTC using bi-directional control and signal bus C. The down-converted frequency output for the selected PTC is demodulated by unit 15. The primary functions of demodulator 15 are recovery and tracking of the carrier frequency, recovery of the transmitted data clock frequency, and recovery of the video data itself. Unit 15 also recovers sampling and synchronization clocks that correspond to transmitter clocks and are used for timing the operation of processor 13, demodulator 15 and decoder 17. The recovered output from unit 15 is provided to decoder 17.

The output from demodulator 15 is mapped into byte length data segments, deinterleaved and Reed-Solomon error corrected according to known principles by unit 17. In addition, unit 17 provides a Forward Error Correction (FEC) validity or lock indication to processor 60. Reed-Solomon error correction is a known type of Forward Error Correction. The FEC lock indication signals that the Reed-Solomon error correction is synchronized to the data being corrected and is providing a valid output. It is to be noted that the demodulator and decoder functions implemented by units 13, 15 and 17 are individually known and generally described, for example, in the reference text *Digital Communication*, Lee and Messerschmidt (Kluwer Academic Press, Boston, Mass., USA, 1988).

In other modes satellite, cable and Internet data is received on input lines 11, 14 and 18 and processed by interface access modules 74, 78 and 72 respectively. Interface modules 74, 78 and 72 incorporate interface functions for satellite, cable and Internet format data respectively. Such functions are known and detailed in applicable standards and other documents. These interface functions correspond to those performed by units 13, 15 and 17 in terrestrial mode. Further, in similar fashion to terrestrial mode, processor 60 configures units 74, 78, 72 and decoder 100 to receive satellite, cable or Internet data using bi-directional control and signal bus C. Decoder 100 processes the data conditioned by units 74, 78 or 72 in these other modes using similar functions as described for terrestrial mode.

The corrected output data from unit 17 is processed by MPEG compatible transport processor and demultiplexer 22. The individual packets that comprise either particular program channel content, or program specific information, are identified by their Packet Identifiers (PIDs). Processor 22 separates data according to type based on an analysis of Packet Identifiers (PIDs) contained within packet header information and provides synchronization and error indication information used in subsequent video, audio and data decompression.

The corrected output data provided to processor 22 is in the form of a transport datastream containing program channel content and program specific information for many programs distributed through several sub-channels. The program specific information in this exemplary description describes sub-channels present in a transport stream of a particular PTC. However, in another embodiment the program specific information may also describe sub-channels located in other PTCs and conveyed in different transport streams. Groups of these sub-channels may be associated in that their source is a particular broadcaster or they occupy the transmission bandwidth previously allocated to an analog NTSC compatible broadcast channel. Further, individual packets that comprise a selected program channel in the transport stream are identified and assembled by processor 60 operating in conjunction with processor 22 using PIDs contained in the program specific information.

The program specific information is acquired and assembled by processor 60, operating in conjunction with unit 22, from the datastream input from unit 17. Processor 60 determines from the FEC lock indication provided by unit 17 that valid data is being provided to transport processor 22. Thereupon, the program specific information MGT and AGDT tables are identified and assembled using predetermined PID values stored within processor 60 internal memory. Using Control signal C, processor 60 configures transport processor 22 to select the data packets comprising the remaining program specific information including the CIT, EIT, ETT and NIT data. The program specific information tables may be acquired from a plurality of sources using the acquisition descriptor information previously described in connection with FIGS. 13 and 14. The tables may be acquired by processor 60 initiating communication with different sources (e.g. satellite, cable, or Internet sources), in different data formats and transmission protocols via different transmission media such as via satellite feed 11, cable line 14 or phone line 18. The acquisition descriptor information, either alone or as supplemented by other program specific information, enables processor 60 to establish communication in different data formats and transmission protocols. This is achieved using interface units 72, 74 and 78 to establish either, uni-directional communication (e.g. for satellite communication), or bi-directional communication (e.g. for Internet communication).

Processor 22 matches the PIDs (or other data identifiers e.g. TCP/IP identifiers, SCIDs etc.) of incoming packets provided by unit 17 (or units 72, 74 and 78 for Internet, cable or satellite data sources) with PID values pre-loaded in control registers within unit 22 by processor 60. Further, processor 60 accesses, parses and assembles the program specific information packets captured by processor 22 and stores the program specific information within its internal memory. Further, in response to a channel SC selection command from remote unit 70 via interface 65, processor 60 derives tuning parameters including PTC carrier frequency, demodulation characteristics, and sub-channel PIDs, from the acquired program specific information including location, acquisition and MOD descriptors. Processor 60 uses this information in configuring units 13, 15, 17 and decoder 100 elements to acquire selected sub-channel (SC) program content.

The packetized decoded transport stream input to decoder 100 from unit 17 (or units 72, 74 or 78) contains video, audio and data representing TV programs, for example, and also contains sub-picture data. The sub-picture data contains picture elements associated with programs and channels selectable by a user for viewing including, multimedia objects, program guides, display commands, subtitling, selectable menu options or other items, for example. As such, the sub-picture data includes multimedia objects acquired using MODs and an EIT containing descriptive lists of programs (events) receivable on the sub-channels listed in a CIT and also contains an ETT containing text messages describing programs and program sub-channels.

The video, audio, data and sub-picture data being transmitted on terrestrial sub-channel SC, together with associated data from satellite, cable or Internet sources from units 74, 78 and 72, is acquired by processor 60 operating in conjunction with unit 22. This is achieved using the collated program specific information including location and MOD descriptors. Processor 60 identifies the video, audio, data and sub-picture data using respective PIDs (or other identifiers) determined from the CIT and descriptors. Processor 60 also initiates communication with other data sources (e.g. cable, satellite or Internet sources) in order to acquire video, audio, data and sub-picture data from these sources. Processor 60 and unit 22 initiates the communication and identifies and captures the video, audio, data and sub-picture data from other sources using location descriptor information of the type previously described in connection with FIGS. 15 and 16. Similarly, processor 60 and unit 22 initiates communication and identifies and captures multimedia objects from other sources using MOD information of the type previously described in connection with FIGS. 6–12. The location descriptor and MOD information, either alone or as supplemented by other program specific information, enables processor 60 to establish communication in different data formats and transmission protocols. As previously explained, this is achieved using interface units 72, 74 and 78 to establish either, uni-directional communication (e.g. in the satellite communication mode), or bi-directional communication (e.g. in cable or Internet communication mode).

Processor 22, matches the PIDs (or other identifiers) of incoming packets provided by decoder 17 and interface units 72, 74 and 78 with identifier values of the video, audio and sub-picture data being transmitted on sub-channel SC and also being input via communication lines 11, 14 and 18. In this manner, processor 22 captures packets constituting the program transmitted on sub-channel SC and associated data and multimedia objects (e.g. advertisements, web page data, interactive icons etc.). Processor 22 forms these packets into MPEG compatible video, audio and sub-picture streams for output to video decoder 25, audio decoder 35 and sub-picture processor 30 respectively. The video and audio streams contain compressed video and audio data representing the selected sub-channel SC program content. The sub-picture data contains multimedia objects and EIT and ETT information associated with the sub-channel SC program content and program guide information.

Decoder 25 decodes and decompresses the MPEG compatible packetized video data from unit 22 and provides decompressed program representative pixel data to NTSC encoder 45 via multiplexer 40. Similarly, audio processor 35 decodes the packetized audio data from unit 22 and provides decoded and amplified audio data, synchronized with the associated decompressed video data, to device 55 for audio reproduction. Processor 30 decodes and decompresses sub-picture data including multimedia objects received from unit 22 to provide image representative multimedia object, text, caption and graphics data. In decoding multimedia objects, processor 30 applies a decoding function determined using the associated MOD information elements exemplified in FIGS. 6 and 7.

Processor 30 (FIG. 18) assembles and formats the decoded and decompressed multimedia object, text, caption and graphics data for output to On-Screen Display (OSD) and graphics generator 37. In formatting decoded multimedia objects, processor 30 (in conjunction with unit 37), under direction of unit 60, determines how, where, and when individual objects are to be displayed from MOD information (or equivalent elements) such as object_format, display_mode, object_start_time, object_duration, object_ frame_size as shown in FIGS. 6 and 7, for example. An individual object may also be linked to other program or program guide images by processor 30 using linkage and attribute descriptors, for example (items 825 and 840 of FIGS. 8 and 9). Alternatively, other descriptors and descriptor elements performing a similar linkage function may be employed. A multimedia object may also be linked with particular sub-channels, program images, scenes or program guide pages or web pages, for example, by incorporating MOD descriptor information into an EIT or CIT or other table. In this method, an object is directly linked to a program image (or sub-channel, scene or program guide or web page image) by association with descriptive elements of the program within the EIT or CIT.

Unit 37 of FIG. 18 interprets and formats the multimedia objects and other data from unit 30 using the linkage and formatting information (as described in connection with processor 30 above) of FIGS. 6 and 8 as supplemented by CIT and EIT information and generates formatted pixel mapped text and graphics for presentation on unit 50 (FIG. 18). The formatted pixel mapped text and graphics data may represent multimedia objects or a program guide or other type of menu or user interface for subsequent display on unit 50. Unit 37 also processes EIT, ETT and other information to generate pixel mapped data representing, subtitling, control and information menu displays including selectable menu options, and other items, for presentation on unit 50. The control and information displays enable function selection and entry of device operating parameters for User operation of decoder 100.

The text and graphics produced by OSD generator 37 are generated in the form of overlay pixel map data under direction of processor 60. The overlay pixel map data from unit 37 is combined and synchronized with the decompressed pixel representative data from MPEG decoder 25 in encoder 45 via multiplexer 40 under direction of processor 60. Thereby multimedia objects such as advertisements, web page data, interactive icons etc. may be included in program content or program guides for display. Combined pixel map data representing a video program and associated multimedia objects together with associated sub-picture text message data is encoded by NTSC encoder 45 and output to device 50 for display.

In a storage mode of the system of FIG. 18, the corrected output data from unit 17 is processed by decoder 100 to provide an MPEG compatible datastream for storage. In this mode, a program is selected for storage by a user via remote unit 70 and interface 65. Processor 22, in conjunction with processor 60 forms condensed program specific information including MGT, AGDT, CIT, EIT and ETT data and location, acquisition and multimedia object descriptors containing the advantageous features previously described. The condensed program specific information supports decoding of the program selected for storage but excludes unrelated information. Processor 60, in conjunction with processor 22 forms a composite MPEG compatible datastream containing packetized content data of the selected program and associated condensed program specific information. The composite datastream is output to storage interface 95.

Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

The architecture of FIG. 18 is not exclusive. Other architectures may be derived in accordance with the principles of the invention to accomplish the same objectives. Further, the functions of the elements of decoder 100 of FIG. 18 and the process steps of FIG. 17 may be implemented in whole or in part within the programmed instructions of a microprocessor. In addition, the principles of the invention apply to any form of MPEG or non-MPEG compatible electronic program guide. A datastream formed according to the invention principles may be used in a variety of applications including video server or PC type communication via telephone lines, for example. A program datastream with one or more components of video, audio and data formed to incorporate program specific information according to invention principles may be recorded on a storage medium and transmitted or re-broadcast to other servers, PCs or receivers.

The invention claimed is:

1. A method for decoding packetized program information to provide data content of a program, comprising the steps of:
   identifying ancillary information in said packetized program information, said ancillary information including a plurality of partition tables having program specific data partitioned therein, a control table for acquiring and re-assembling the partitioned program specific data disposed in the plurality of partition tables, and multimedia object description information associated with an image in said packetized program information, said multimedia object description information comprising,
   (a) a location indicator identifying a location of a multimedia object for use in acquiring said multimedia object, and
   (b) a type indicator identifying a multimedia object type for use in decoding said multimedia object;
   forming a program guide for display, using the plurality of partition tables;
   acquiring and decoding said multimedia object using said multimedia object description information; and
   formatting said multimedia object for display.

2. The method according to claim 1, including the step of associating said multimedia object with one of (a) a video image, and (b) audio data.

3. The method according to claim 2, including the step of forming a composite image for display combining said multimedia object and at least one of, (a) an electronic program guide, (b) a video program, and (c) an Internet web page image.

4. A method for providing packetized program information to provide data content of a program, comprising the steps of:
   partitioning program specific data into a plurality of partition tables;
   generating a control table for acquiring and re-assembling the program specific data disposed in the plurality of partition tables;
   incorporating, into any of the plurality of partition tables, (a) a location indicator identifying a location of a multimedia object, and (b) a type indicator identifying a multimedia object type for use in decoding the multimedia object; and
   transmitting the plurality of partition tables and control table in packets for subsequent use in forming a program guide that references the multimedia object and in acquiring the multimedia object using at least the location indicator and the type indicator.

5. The method according to claim 4, further comprising the step of formatting the plurality of partition tables and the control table according to one of a selected media and protocol, in preparation for said transmitting step.

6. The method according to claim 4, wherein the program specific data comprises at least one of network types, time segments, channel groups, transport stream channel groupings and event types.

7. The method according to claim 4, wherein said location indicator is capable of identifying a location of said multimedia object in any of (a) said packetized program information from a first source, and (b) information derived from a second source different to said first source.

8. The method according to claim 7, wherein said location indicator is capable of identifying a location of said multimedia object derived from said first source using any of (a) an MPEG compatible packet Identifier (PID), and (b) an MPEG compatible Digital Storage Media code.

9. The method according to claim 8, wherein said location indicator is capable of identifying a location of said multimedia object derived from said second source using any of (a) an Internet URL, (b) an Internet IP address, (c) an Email address, and (d) a telephone/fax/videophone number.

10. The method according to claim 4, wherein said multimedia object type comprises at least one of, (a) a video segment or still image, (b) an audio segment, (c) text, (d) an Internet web page or Internet data, (e) an advertisement, (f) an icon for user selection of a service, (g) an animation segment, (h) an Email message, (i) a user prompting indicator, and (j) a broadcast channel identification icon.

11. The method according to claim 4, wherein said formatting step comprises the step of associating said multimedia object with one of (a) a video image, and (b) audio data, and said formatting means forms a composite image for display combining said multimedia object and at least one of, (a) an electronic program guide, (b) a video program, and (c) an Internet web page image.

* * * * *

UNITED STATES PATENT AND TRADEMARK OFFICE
CERTIFICATE OF CORRECTION

PATENT NO. : 7,150,029 B1
APPLICATION NO. : 09/529184
DATED : December 12, 2006
INVENTOR(S) : Mark Jacob Ebling et al.

It is certified that error appears in the above-identified patent and that said Letters Patent is hereby corrected as shown below:

Title page item [22] "371 (c) (1), (2), (4)" date should read --Apr. 7, 2000--.

Signed and Sealed this

Seventh Day of August, 2007

JON W. DUDAS
*Director of the United States Patent and Trademark Office*